March 17, 1959  W. E. W. NICOLLS ET AL  2,878,064
LIQUID FUEL INJECTION NOZZLES FOR INTERNAL COMBUSTION ENGINES
Filed May 27, 1957
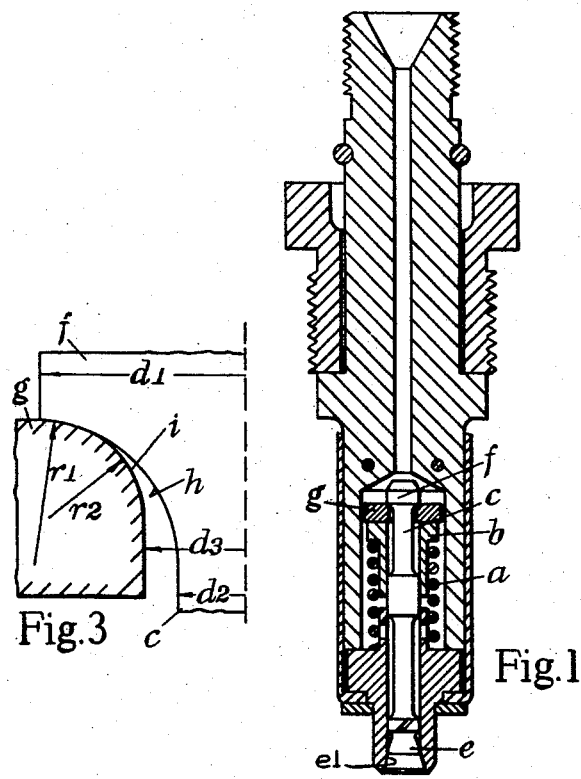
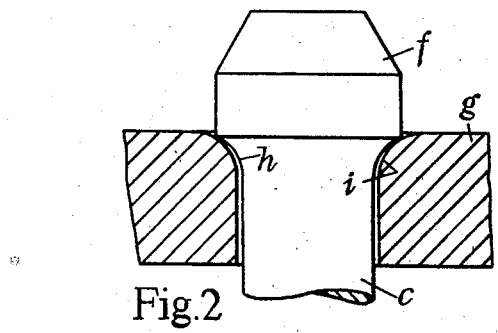
Inventors
W.E.W. Nicolls
P. Howes
By Mason & Downing Seebold
Attys.

United States Patent Office 2,878,064
Patented Mar. 17, 1959

2,878,064

LIQUID FUEL INJECTION NOZZLES FOR INTERNAL COMBUSTION ENGINES

Wilfrid Edward Walter Nicolls, Pinner, and Peter Howes, Croxley Green, Rickmansworth, England, assignors to C. A. V. Limited, London, England Application May 27, 1957, Serial No. 661,799

Claims priority, application Great Britain May 30, 1956

1 Claim. (Cl. 299—107.6)

This invention relates to liquid fuel injection nozzles of the poppet valve type for internal combustion engines, the closure member of the valve being movable to its open position by pressure of the fuel, and to its closed position by a spring acting on a head at the inner end of the stem of the closure member.

In a known construction as illustrated for example by Figures 2 and 10 of U. S. Patent No. 2,410,946, issued to L. E. Johnson on November 12, 1946, a spring acts on a collar surrounding the stem at its junction with the said inner head. It has been found that if the portion of the stem at the said junction is made of cylindrical form, resulting in an abrupt change of shape between the stem and the flat under face of the head, fracture of the stem is liable to occur at the junction due to the recurrent impactive forces exerted by the spring. To obviate this condition the junction between the stem and the head has been made to a conical form, the contiguous edge of the hole in the collar being shaped to a complementary form. It has been found, however, that whilst this device minimises risk of fracture of the stem, it is unsatisfactory in that it is liable to result in bursting of the collar.

The object of the present invention is to provide an improved construction which reliably avoids both of the eventualities above-mentioned.

An injection nozzle of the poppet valve type in accordance with the invention includes a closure member stem which at its junction with a head at the inner end of the stem is shaped to a concave curved form, and a collar having the contiguous edge of the part of its hole which embraces the stem, rounded to a convex form of smaller radius than the concave part of the stem.

The invention is illustrated in the accompanying drawings, wherein:

Figure 1 is a longitudinal sectional view of a poppet valve in accordance with the invention, Figure 2 is a view, partly in section, showing on a larger scale the connection between the head of the stem and the collar surrounding the stem, and Figure 3 is a view showing the curvatures of the engaging portions of the head of the stem and the collar.

Referring to the drawings more specifically, Figure 1 shows a spring $a$ acting on a sleeve $b$ surrounding the stem $c$ of the closure member $e$, and between one end of the sleeve and the head $f$ of the stem is placed a collar $g$ having therein a key-hole slot which enables the collar to be placed in position on the sleeve, the spring serving to urge the closure member on to a seat $e^1$.

In carrying the invention into effect, as shown in Figure 2, the inner end of the stem $c$ of the closure member has formed on it a head $f$ the junction $h$ of which and the cylindrical part of the stem being shaped to a curved concave form of such radius as will minimise the occurrence of severe stresses at the junction due to the impactive forces exerted by the spring. For a head of 3 mm. diameter, and a stem of 2 mm. diameter, a concave part of 0.75 mm. radius is for most purposes satisfactory.

The portion of the stem adjacent to the inner end of the stem is surrounded by a sleeve as shown in Figure 1, which sleeve is shaped to support one end of the coaxial compression spring, the other end of which is supported on a shoulder in the body part. The collar $g$ which is placed between one end of the sleeve and the head on the inner end of the stem has formed in it a key-hole slot one part of which is of sufficient size to enable the collar to be placed in position over the head, and the other part which (when the collar is in position) embraces the stem is made to a diameter which is a little greater than the diameter of the stem. Also the edge $i$ of this last mentioned part of the hole which makes contact with the concave part of the stem is rounded to a curvature which is greater than that of the said part of the stem, a radius of 0.7 mm. being suitable for the above mentioned curvature of the stem.

In general the curvatures of the parts $h$, $i$ on the stem and collar respectively should preferably satisfy the following limiting conditions as defined with reference to Figure 3. Let $d1$ be the diameter of the head $f$, $d2$ the diameter of stem $c$, $d3$ the diameter of the cylindrical part of the hole in the collar $g$, $r1$ the radius of the concave part $h$ on the stem, and $r2$ the radius of the convex part $i$ of the collar, then: $r1$ must not be less than $(d1-d2)/2$ and not greater than $(d1-d2)$; $r2$ must not be less than $0.8r1$; and $d2+2r1$ must not be less than $d3+2r2$.

By so constructing both stem and collar, the stem can be suitably strengthened at the part where fracture is liable to occur, and at the same time the imposition of a bursting force on the collar is minimised.

Having thus described our invention what we claim as new and desire to secure by Letters Patent is:

In a poppet valve for liquid fuel injection nozzles having a stem provided at one end with an integral closure member and at the opposite end with an integral head, a seat for the closure member, an annular collar surrounding the stem and bearing against the head, and a spring acting on the head through the collar for urging the closure member on to the seat, the junction of the stem with the head being concave and the contiguous inner peripheral edge portion of the collar which is in contact with the said junction being convex, the improvement comprising in having the curvatures of the concave junction between the head and the stem and of the contacting convex inner peripheral edge portion of the collar satisfy the following conditions: $r1$ is greater than $$\frac{(d1-d2)}{2}$$

and less than $(d1-d2)$; $r2$ is not less than $0.8r1$, and $(d2+2r1)$ is not less than $(d3+2r2)$, where $d1$ is the diameter of the head, $d2$ the diameter of the stem, $d3$ the internal diameter of the collar, $r1$ the radius of curvature of the said junction, and $r2$ the radius of curvature of the said convex portion.

References Cited in the file of this patent

UNITED STATES PATENTS 2,410,946    Johnson _____ Nov. 12, 1946